UNITED STATES PATENT OFFICE.

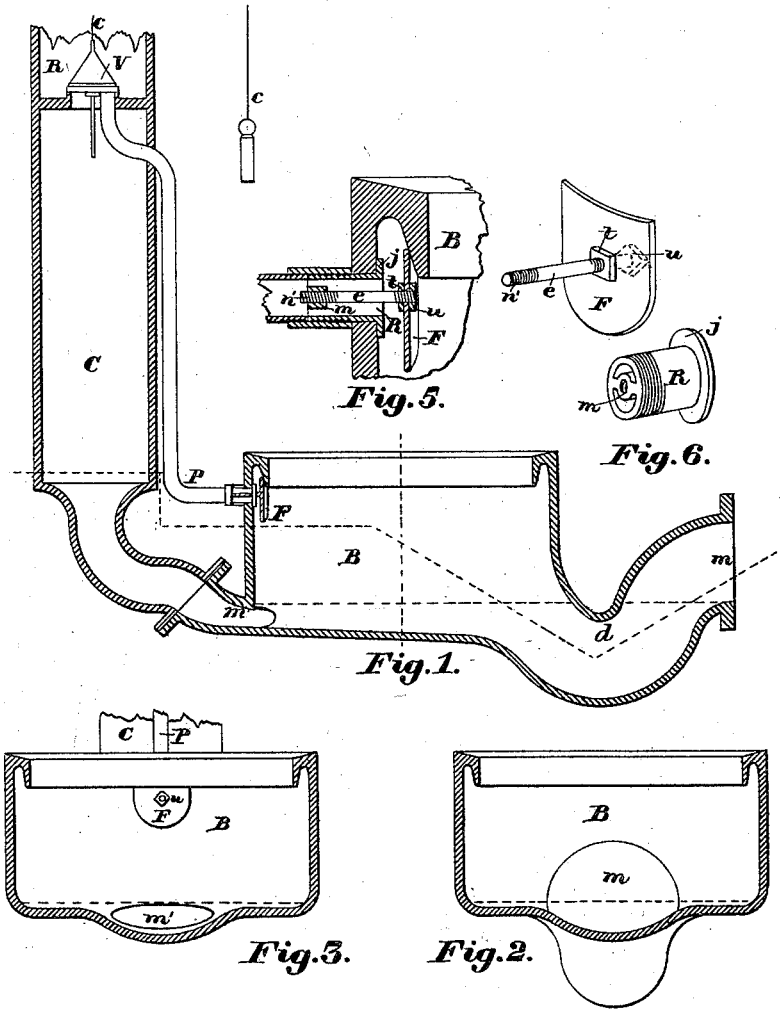

JOHN PICKERING PUTNAM, OF BOSTON, MASSACHUSETTS.

WATER-CLOSET.

SPECIFICATION forming part of Letters Patent No. 285,928, dated October 2, 1883.

Application filed June 2, 1882. (No model.)

*To all whom it may concern:*

Be it known that I, JOHN PICKERING PUTNAM, of Boston, in the State of Massachusetts, have invented certain new and useful Improvements in Water - Closets and Similar Waste-Receptacles, of which the following is a specification.

The invention consists, broadly, in the combination, with the basin of a water-closet or similar waste-receptacle sealed by a trap at the bottom thereof, of an air-tight water-supply chamber communicating with the said trap immediately below the normal level of the water therein, so that a column of water may be supported in said chamber by the pressure of the atmosphere upon the water in the trap.

The invention consists, further, in the combination, with the basin of a water-closet or similar waste-receptacle sealed by a trap at the bottom thereof, of an air-tight water-supply chamber communicating with the said trap immediately below the normal level of the water therein, so that a column of water may be supported in said chamber by the pressure of the atmosphere upon the water in the trap, and having a valve, by opening which air may be admitted to counterbalance the pressure of the atmosphere upon the water in the trap.

The invention consists, also, in certain details of construction embodied in apparatus which I have contrived for putting the main part of my improvement in practice.

In the drawings, Figure 1 is a vertical section of apparatus embodying my invention as applied to a trapped water-closet. Fig. 2 is a vertical section through the basin, looking toward the trap. Fig. 3 is a partial vertical section through the basin, looking toward the water-supply chamber. Fig. 4 is a horizontal section of the same apparatus. Figs. 5 and 6 are upon an enlarged scale, and have reference to a fan employed with a flushing-pipe, as will hereinafter appear.

B is the trapped basin, its dip $d$ being below any portion of its outlet $m$, as shown.

C is the water-supply chamber, the upper part of its mouth $m'$, by which it communicates with the trapped basin, being upon the level of the lowest part of the drip $d$ and below the level of the lowest part of the outlet $m$. The chamber C is kept normally full of water, as will hereinafter be described, and it follows that when water stands in the trap to the level of the lowest part of the outlet $m$, or, in other words, to the level of the seal, the pressure of the atmosphere upon the water in the trap will prevent water from flowing from the chamber through its mouth $m'$ into the basin or trap; but when, by evaporation or siphonage, the water in the trap falls below the level of the upper portion of the mouth $m'$, air enters the mouth $m'$, and, rising in bubbles to the top of the chamber, causes water to flow therefrom until the mouth $m'$ is covered and the seal of the trap restored.

V is a valve in the top of the water-supply chamber C. Its main purpose is to admit the pressure of air to the surface of the water in the chamber C, although in actual construction a second water chamber or reservoir is placed above the chamber C, the valve V being between the two chambers and the water in the upper chamber or reservoir, R, being open to the air. The pressure of the atmosphere is accordingly directly upon the water in the upper reservoir, and acts upon the column of water in the lower chamber, C, and then indirectly only when the valve V is lifted from its seat. This is done by a cord, $c$.

It is obvious that the pressure of the atmosphere, acting directly or indirectly upon the column of water in the chamber C when the valve V is open, will counterbalance the pressure of the atmosphere upon the water in the basin and trap, and consequently that when the valve V is open the water in the chamber C will descend of its own weight to flush the basin and trap. In the apparatus shown, since the port of the valve V is larger in area than the mouth $m'$, the chamber C will always be full of water if a sufficient supply is maintained in the reservoir R.

It is obvious that, without departing from that part of my invention thus far set forth, the mouth of the chamber C may open into the trap below the level of the seal in any required direction. In the apparatus shown water flows from the chamber C directly across the floor of the basin, so as to contend at a great advantage with the inertia of the water and waste matter, if any there be, lying in the bend of the trap, while water for an upper flushing enters the basin through an independent pipe, P, one arm of which extends into the port of the valve V, so that a single valve controls the flow of water from the chamber C and the flow of water through the pipe P; but, as shown in other applications for patents filed herewith or now pending, without departing from the present invention, water may be introduced from the chamber C for both an upper and lower flushing of the basin B, and the basin B may be furnished with a false bottom or floor to divide the lower-flushing stream, so that a part of it may be directed with still greater force against the contents of the trap. These modifications are not claimed herein, since they form the subject-matter of claims in said other application.

Figs. 5 and 6 give a novel and convenient form of adjustable fan. F is the fan proper, made slightly curved to fit any ordinary bowl. Passing loosely through the center of the fan is a stout stem, $e$, threaded at both ends, and having a fixed shoulder, $t$, behind the fan and a nut, $u$, in front of the fan. R is a coupling with a shoulder, $j$, and a threaded bearing, $m$, to receive the threaded end $n'$ of the fan-stem $e$. The water-closet bowl is drilled to receive the pipe or coupling R, the hole being just large enough to receive the body of the pipe, the shoulder $j$ resting against the inside surface of the water-closet bowl. This coupling is firmly secured to the bowl. The stem is next put through it from the inside of the bowl and the end $n'$ threaded into the bearing $m$ until the shoulder $t$ stands at the desired distance from the inner surface of the bowl to accommodate the fan to the size and strength of the flushing stream. The fan F is then put on and screwed up tightly against the shoulder $t$ by means of the nut $u$. The stem cannot be unthreaded at $u$ by the action of the water, because it is held tight by the fan F, which is itself held from turning by its two upper square shoulders, which rest against the upper rim of the bowl.

I claim—

1. The combination, with a trapped basin for a water-closet or similar receptacle, of an air-tight water-chamber communicating with the trap of said basin immediately below the normal water-level thereof, substantially as described.

2. The combination, with a trapped basin for a water-closet or similar receptacle, of an air-tight water-chamber communicating with the trap of said basin immediately below the normal water-level thereof, and provided with a valve through which the pressure of the air may be admitted to counterbalance the pressure of the atmosphere upon the water in the trap of said basin, substantially as described.

3. The combination, with the trapped basin B, of the air-tight chamber C, provided with the valve V, substantially as described.

4. The combination of the trapped basin B, air-tight chamber C, reservoir R, and valve V, substantially as described.

5. A trapped basin provided with an air-tight water-supply chamber normally closed, except at a mouth entering the trap below the level of its seal, and also provided with an independent supply-pipe entering the said basin near the upper line thereof, substantially as described.

6. The combination of the trapped basin B, reservoir R, air-tight chamber C, pipe P, and valve V, substantially as described.

7. The combination, with the bowl or basin of a water-closet or similar receptacle, of an adjustable fan or plate, F, and threaded stem $e$, screwing into a coupling, R, secured to the bowl or basin.

8. The combination of the fan or plate F, stem $e$, having threading $n'$ and shoulder $t$, and nut $u$, with the coupling R, having shoulder $j$.

JNO. PICKERING PUTNAM.

Witnesses:
ALEX. P. BROWNE,
JOHN J. BLIGH.